(12) United States Patent
Armstrong et al.

(10) Patent No.: US 8,612,700 B1
(45) Date of Patent: Dec. 17, 2013

(54) METHOD AND SYSTEM OF PERFORMING BLOCK LEVEL DUPLICATIONS OF CATALOGED BACKUP DATA

(75) Inventors: Richard Armstrong, White BearLake, MN (US); James Harris, Woodbury, MN (US); Girish Jorapurkar, Woodbury, MN (US); Abdul Rasheed, Blaine, MN (US); Sean Tu, Eagan, MN (US)

(73) Assignee: Symantec Corporation, Mountain View, CA (US)

( * ) Notice: Subject to any disclaimer, the term of this patent is extended or adjusted under 35 U.S.C. 154(b) by 433 days.

(21) Appl. No.: 12/915,760

(22) Filed: Oct. 29, 2010

(51) Int. Cl.
*G06F 12/02* (2006.01)

(52) U.S. Cl.
USPC .......................................... 711/161; 711/165

(58) Field of Classification Search
USPC ................................................ 711/161, 165
See application file for complete search history.

(56) References Cited

U.S. PATENT DOCUMENTS

| | | | |
|---|---|---|---|
| 5,511,177 A | 4/1996 | Kagimasa et al. | |
| 5,649,196 A | 7/1997 | Woodhill et al. | |
| 5,909,540 A | 6/1999 | Carter et al. | |
| 5,991,804 A | 11/1999 | Bolosky et al. | |
| 6,157,935 A | 12/2000 | Tran et al. | |
| 6,389,433 B1 | 5/2002 | Bolosky et al. | |
| 6,499,039 B1 | 12/2002 | Venkatesh et al. | |
| 6,513,051 B1 | 1/2003 | Bolosky et al. | |
| 6,530,035 B1 | 3/2003 | Bridge | |
| 6,629,202 B1 | 9/2003 | Cabrera et al. | |
| 6,728,831 B1 | 4/2004 | Bridge | |
| 6,847,984 B1 | 1/2005 | Midgley et al. | |
| 6,880,102 B1 | 4/2005 | Bridge | |
| 6,883,073 B2 | 4/2005 | Arakawa et al. | |
| 6,889,249 B2 | 5/2005 | Miloushev et al. | |
| 6,920,537 B2 | 7/2005 | Ofek et al. | |
| 6,928,467 B2 | 8/2005 | Peng | |
| 7,076,688 B2 | 7/2006 | Yamamoto | |
| 7,131,027 B2 | 10/2006 | Kodama et al. | |
| 7,146,524 B2 | 12/2006 | Patel et al. | |
| 7,155,585 B2 | 12/2006 | Lam et al. | |
| 7,200,604 B2 | 4/2007 | Forman et al. | |
| 7,359,920 B1 | 4/2008 | Rybicki et al. | |
| 7,424,514 B2 | 9/2008 | Noble et al. | |
| 7,478,113 B1 | 1/2009 | De Spiegeleer et al. | |
| 2002/0059505 A1* | 5/2002 | St. Pierre et al. | 711/162 |
| 2002/0120763 A1 | 8/2002 | Miloushev et al. | |
| 2004/0133607 A1 | 7/2004 | Miloushev et al. | |
| 2005/0066095 A1 | 3/2005 | Mullick et al. | |
| 2005/0204108 A1* | 9/2005 | Ofek et al. | 711/162 |
| 2007/0050423 A1 | 3/2007 | Whalen et al. | |
| 2007/0180306 A1 | 8/2007 | Soran et al. | |
| 2008/0294696 A1* | 11/2008 | Frandzel | 707/200 |
| 2010/0058012 A1* | 3/2010 | Okada et al. | 711/162 |

OTHER PUBLICATIONS

"Veritas Storage Foundation T.M. Technical Overview," Veritas Software Corporation, pp. 1-37, Apr. 2002.

\* cited by examiner

*Primary Examiner* — Jared Rutz
(74) *Attorney, Agent, or Firm* — Rory D. Rankin; Meyertons, Hood, Kivlin, Kowert & Goetzel, P.C.

(57) ABSTRACT

A system, method, and medium for performing data duplication from a first storage device to a second storage device at a block level. A backup application processes metadata prior to replicating the data to determine the best method for performing the duplication operation. Several images may be selected for duplication, and instead of copying the images one at a time, the backup application copies data from the first storage device to the second storage device block-by-block. The catalog metadata may be updated so that the backup application may be made aware of the new copy of data. The replicated data may be accessed for future restore operations such that individual files may be retrieved from the replicated data by the backup application.

17 Claims, 5 Drawing Sheets

METHOD AND SYSTEM OF PERFORMING BLOCK LEVEL DUPLICATIONS OF CATALOGED BACKUP DATA

BACKGROUND OF THE INVENTION

1. Field of the Invention

The present invention relates generally to data duplication, and in particular to a method and system for duplicating data at a block level from a first storage medium to a second storage medium.

2. Description of the Related Art

The importance of data to businesses and other organizations necessitates ensuring the preservation of the data. One way to preserve data is to back it up to multiple separate sources of backup storage media. Typically, when data is written from one storage medium to another, it is written on a file-by-file basis. This method of writing on a file-by-file basis may result in a slow duplication process.

The duplication of data may be time-consuming due to factors relating to the data being replicated and how it is stored on a source storage medium. One of these factors is reading from or writing to a file system that is fragmented. Another factor that may impact performance is the size of the metadata in relation to the size of the data. A third factor impacting performance is the density of images stored in blocks on the source storage medium. One or more of these factors may contribute to a slow duplication operation as compared to the peak read and write speeds of the backup system's storage media. In some cases, when writing data on a file-by-file basis, metadata may be written to a catalog of metadata after each file is written to the second storage medium. When many files are being duplicated, updating the catalog metadata after copying each file may be a bottleneck for the duplication operation.

Other factors may contribute to cause delays when duplicating data, such that data from the source device is not being read fast enough to write to the target device. For example, a tape drive may be the target storage device during a duplication operation, and writing to a tape drive is typically performed at a constant speed. If data is not being read fast enough from the source device to fill up the write buffer of the target tape drive, the target tape drive may run out of data to write. When this happens, the tape drive will still be moving forward at a fixed speed. The tape drive will then need to return to the place on the tape where it ran out of data. This type of operation is called backstitching, and this can add to the overhead of duplicating data from a first storage device to a second storage device. Backstitching is not limited to tape drives; backstitching or other similar backtracking movements can occur for other types of storage devices (e.g., disk drives, optical drives).

In many cases, the data selected for duplication may be a plurality of images. A typical method for duplicating a plurality of images is to locate the first image on the first storage device, read the image, and then copy it to a second storage device. Then, the typical method would move to the next image, read the image, and then copy it to the second storage device. This method would continue for all of the images selected for duplication. This traditional method may require repositioning after reading each image. As the number of images selected for duplication increases, this repositioning can waste time and increase the inefficiency and overhead of the duplication operation.

A faster method of duplicating data may be copy data block-by-block at a raw level from one medium to another medium. However, typical block level replication techniques do not include updating a catalog of metadata with metadata on the new copies of data such that a backup application may be aware of or be able to access the new copies for restoration operations. It would be desirable to perform a block level replication of data from a primary storage medium to a secondary storage medium while maintaining the ability to access the data on the secondary storage medium. A user may wish to retrieve one or more individual files from the backup storage media, and a backup application may have the flexibility to choose from the primary and/or the secondary storage medium.

In view of the above, improved methods and mechanisms for performing block level data duplication while maintaining up-to-date catalog metadata are desired.

SUMMARY OF THE INVENTION

Various embodiments of methods and mechanisms for performing data duplication are contemplated. In one embodiment, a backup application may pre-process metadata associated with data on a first storage medium before copying the data to a second storage medium. The metadata may be processed to determine the level of fragmentation on the first and second storage mediums, the metadata to data size ratio, the locations of the data on the first storage medium, and the image or file density per block of the data on the first storage medium. Based on these factors, the backup application may determine how to duplicate the data at a block level using one of several tunable levels. The backup application may also update the catalog metadata with references to the duplicated data on the second storage medium, such that the duplicated data may be accessed by the backup application for restoration operations.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
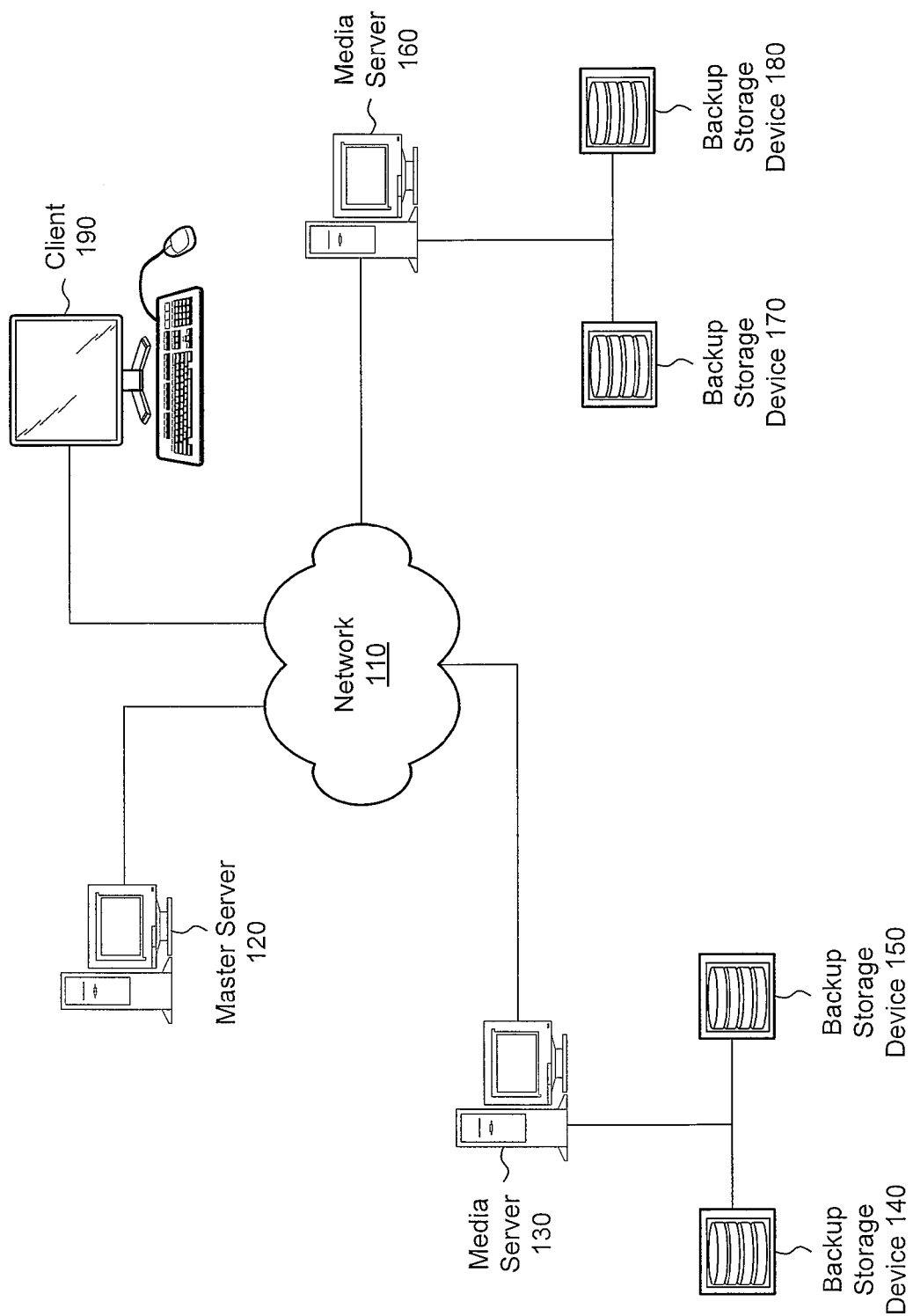
FIG. 1 is a diagram that illustrates a backup storage system architecture in accordance with one or more embodiments.

Referring to FIG. 1, a generalized block diagram of one embodiment of a backup storage system architecture is shown. Master server 120 is connected to network 110, and in one embodiment, master server 120 may manage the storage system depicted in FIG. 1. Network 110 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. In various embodiments, the network architecture of FIG. 1 may be implemented as part of a cloud computing platform. Other network connections and architectures are possible and are contemplated.

Client 190 is connected to network 110, and client 190 may be a user computer with data to back up. The data may be files, images (e.g., tar images, virtual machine disk images), or other types of formatted information. In another embodiment, client 190 may be directly attached to a storage device (not shown) to which data is backed up and/or from which data is restored. Client 190 may include a client agent that communicates with one of the media servers and/or master server 120 in performing the backup and restore operations. Client 190 is representative of any number of stationary or mobile computers such as servers, desktop PCs, laptops, handheld computers, smartphones, or other computing devices connected to network 110.

Master server 120 may manage data protection activities such as the scheduling of backup and restore operations and the maintenance of a catalog of metadata usable for management of the entire backup system architecture. A catalog of metadata may contain information about the data that is stored on the plurality of storage devices managed by master server 120. In one embodiment, master server 120 or another controlling component may assign backup data between media servers 130 and 160 and their respective backup storage devices. The controlling component may be centralized or distributed in various embodiments. In one embodiment, an administration console may provide a graphical user interface (GUI) and/or command-line interface (CLI) for configuration of the networked backup environment.

Media servers 130 and 160 are also connected to network 110. Media servers 130 and 160 are representative of any number of media servers that may be connected to network 110. Media server 130 may be configured to store backup data in backup storage devices 140 and 150, and media server 160 may be configured to store backup data in backup storage devices 170 and 180. Backup storage devices 140, 150, 170, and 180 are representative of any number of backup storage devices, and may comprise any of a variety of types of storage medium, such as a hard disk drive, an optical drive, tape drive, robotic tape library, or other medium. For some types of storage media, such as a disk medium, the data stored on the storage medium may be organized as a file system, which may reference and store data, hierarchically organized in files and directories, in a volume created on a storage medium. The file system may provides access to the data on the storage medium.

Backup storage devices 140, 150, 170, and 180 may be further coupled to several varieties of storage devices consisting of one or more hard disks, disk arrays, tape drives, tape libraries, server blades, or specialized devices, and may include a variety of memory devices such as RAM, Flash RAM, MEMS (Micro Electro Mechanical Systems) storage, battery-backed RAM, and/or non-volatile RAM (NVRAM), etc. In other embodiments, media servers 130 and 160 may have network connections to remote storage media or access to a storage area network (SAN).

Media server 130 and backup storage devices 140 and 150 may be connected over a SAN. Media server 160 and backup storage devices 170 and 180 may also be connected over a SAN. A SAN is a specialized, high-speed network attaching servers and storage devices. In some embodiments, a SAN may be built on a fibre channel architecture; a fibre channel is a serial interface typically implemented with fiber-optic cable. To enable connections between storage devices and media servers, a SAN may include various elements in a SAN fabric such as one or more switches, routers, hubs, etc. The elements in the SAN fabric may include network and storage interfaces, memories, and processors operable to execute program instructions. In one embodiment, media servers and/or elements in the SAN fabric may include a volume manager that enables the management of physical storage resources as logical entities such as volumes. In other embodiments, backup storage devices 140 and 150 may be attached directly to media server 130. Also, backup storage devices 170 and 180 may be attached directly to media server 160. For example, backup storage devices 140 and 150 may be adapter cards directly attached to a bus of media server 130.

In some operations, master server 120 may duplicate data from one backup storage device to another backup storage device. Master server 120 may duplicate data by copying data at a block level instead of at a file or image level. Copying at a block level involves copying data from a first device block-by-block to a second device. Block level writing may result in a faster transfer of data than writing on a file-by-file basis.

Master server 120, media servers 130 and 160, and client 190 of FIG. 1 may comprise various hardware and software components. The hardware components may include one or more processors, memory devices, and input/output (I/O) devices, connected together over a bus architecture. The software components may include an operating system stored in a memory device. The operating systems may be any of various types of operating systems, such as Microsoft Windows®, Linux®, Solaris®, or others. The operating system may be operable to provide various services to a user and may support the execution of various programs such as backup applications, server applications, software agents, or any of a variety of other software applications.

In other embodiments, the number and type of master servers, media servers, clients, networks, and storage devices is not limited to those shown in FIG. 1. Any number and combination of servers, desktops, laptops, mobile clients, and storage devices may be interconnected in network architectures via various combinations of modem banks, direct LAN connections, wireless connections, WAN links, etc. Also, at various times one or more clients and servers may operate offline. In addition, during operation, individual client and server connection types may change as mobile users travel from place to place connecting, disconnecting, and reconnecting to network 110. Other embodiments of network architectures including different components and connections than those shown in FIG. 1 are possible and contemplated.

Figure 2:
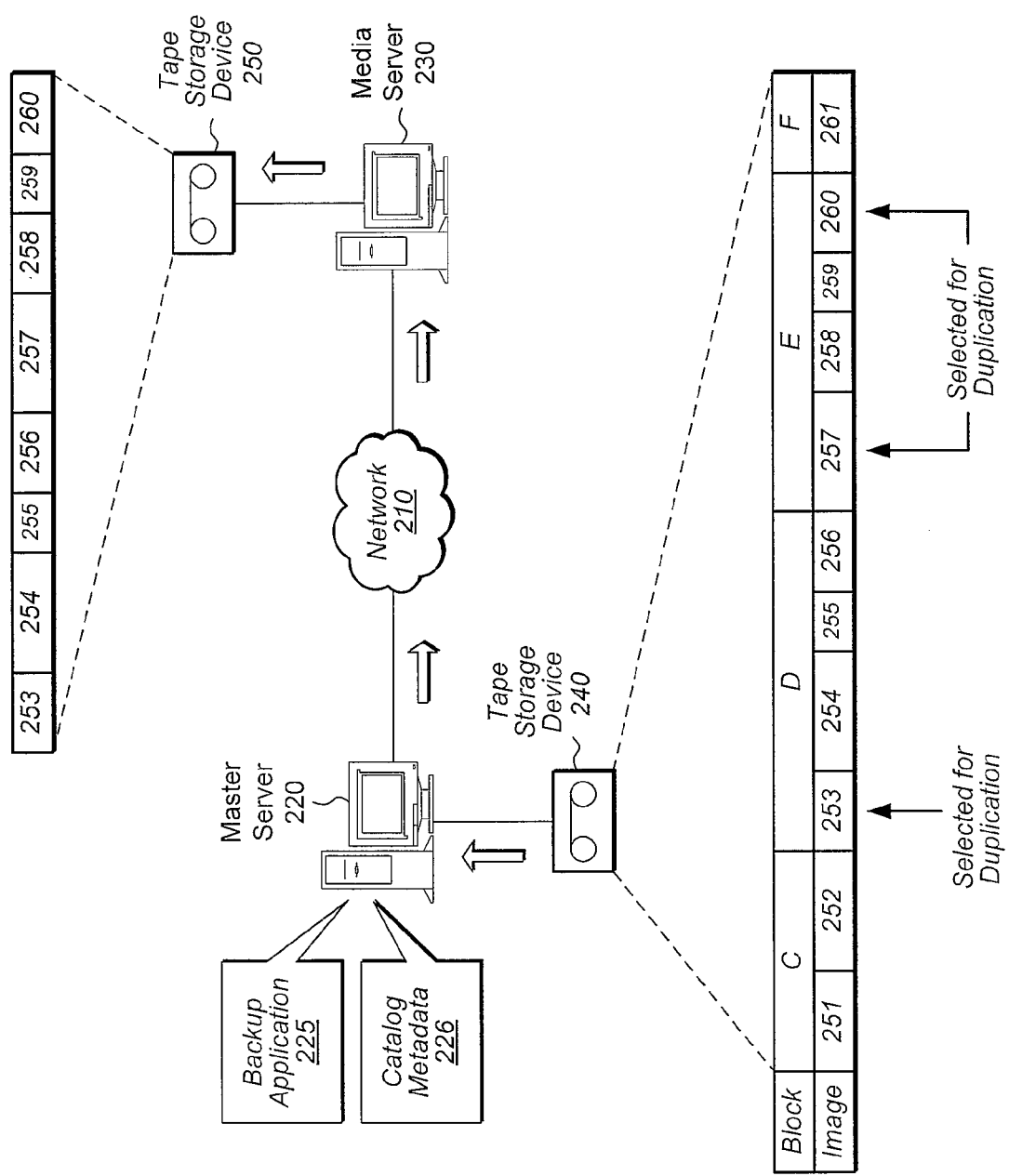
FIG. 2 illustrates one embodiment of a system to duplicate data.

Referring now to FIG. 2, one embodiment of a system to duplicate data is shown. Master server 220 is connected to tape storage device 240 on which data is stored. Master server 220 is also connected to network 210, and master server 220 may send data from tape storage device 240 to media server 230 via network 210. Data may be sent from master server 220 to media server 230, and then from media server 230 to tape storage device 250. The block arrows of FIG. 2 represent the flow of data during the illustrated duplication operation. In other embodiments, master server 220 may replicate data from tape storage device 240 to another storage device (not shown) connected directly to master server 220. Backup application 225 is a software application running on master server 220. In other embodiments, backup application 225 may run on another server, client, or computing device. Backup application 225 may access catalog metadata 226, which is stored on master server 220. In other embodiments, catalog metadata 226 may be stored and maintained by a media server, client, or other computing device. The information contained in catalog metadata 226 may allow backup application 225 to keep track of which images or files exist in the backup storage system and where those images or files are stored.

Tape storage devices 240 and 250 are representative of any type of storage devices (e.g., disk, optical, flash drive). Tape storage devices 240 and 250 may each be a part of a tape volume containing multiple tape storage devices. As shown in FIG. 2, tape storage device 240 stores images 251-261. Images 251-261 may be stored in tape storage device 240 within blocks and accessed according to block markers. For example, images 251-252 are stored in block C, images 253-256 are stored in block D, images 257-260 are stored in block E, and image 261 is stored in block F. In other embodiments, data may be stored on storage devices in formats other than images. For example, in one embodiment, data may be stored as files as part of a file system. Other organizations and formats for storing data are possible and contemplated.

In the example shown in FIG. 2, three images are selected for duplication. In other embodiments, more or fewer than three images may be selected for duplication. Images may be selected for duplication by a user, backup application 225, or another software application on master server 220 or on another server. In some embodiments, a user interface may be presented to the user, allowing the user to select the images or files to be duplicated. For the example illustrated in FIG. 2, the three images selected for duplication are images 253, 257, and 260.

To determine the positions and sizes of images stored within tape storage device 240, backup application 225 on master server 220 may read catalog metadata 226. Catalog metadata 226 may be processed before the duplication operation to determine the location of images within tape storage device 240. Backup application 225 may also process catalog metadata 226 to predict the amount of storage space needed on tape storage device 250 to perform the duplication operation. In addition, backup application 225 may read the catalog metadata 226 to determine which blocks contain the selected images. Tape storage device 240 may be organized according to blocks, and the location of block boundaries may be easier to locate when reading tape storage device 240 than locating the beginning of a selected image and the ending of a selected image. After determining the location of images and collecting other information associated with the images from catalog metadata 226, backup application 225 may determine how to duplicate the selected images. After backup application 225 has queried catalog metadata 226 regarding the selected images, backup application 225 may arrange the images in a specific order for the duplication operation. Backup application 225 may build a map of the selected images, and for each image, the map may show a storage device identification, a tape file number, block address, block offset, and number of blocks. This map may help to optimize the storage device mount process and the replication of blocks to tape storage device 250. The map may also allow block offsets to be extended and new offsets to be calculated for tape storage device 250. In addition, the map may allow images to be pre-arranged and sorted so that the range of blocks and offsets to the images within the blocks are known.

After processing catalog metadata 226 and building the map, backup application 225 may locate the first block containing a selected image on tape storage device 240. In the illustrated example, block D is the first block containing a selected image (i.e., image 253). Then, backup application 225 may determine the last block containing a selected image on tape storage device 240, which in this case is block E. In the illustrated example, the first and last blocks are contiguous blocks on tape storage device 240. In other embodiments, there may be a plurality of blocks between the first and last block on a storage device, and one method for duplicating data may involve copying all of the blocks in between and including the first and last block.

In FIG. 2, the illustrated method may use more storage space at tape storage device 250 than is needed for only the selected images, but may result in a faster duplication operation as opposed to duplicating on an image-by-image basis. Instead of repositioning after each image, the method in FIG. 2 starts reading at block D, at the start of image 253, and continues reading until the end of block E, at the end of image 260. The contents of tape storage device 240 may be written block-by-block to tape storage device 250. As a result, all images from image 253 through image 260 may be copied to tape storage device 250. This block-by-block duplication requires a limited number of handling and overhead operations and does not require any repositioning of tape storage device 240 during the duplication process. In addition, after images 253-260 have been written to tape storage device 250, catalog metadata 226 may be updated with references to images 253-260 on tape storage device 250. Updating catalog metadata 226 with references to images 253-260 stored on tape storage device 250 may allow for future restore operations to make use of these copies of images 253-260. Images 254-256 and 258-259 were not selected for duplication, but as these copies were written to tape storage device 250, catalog metadata 226 may also be updated to reference these unintended copies, so that backup application 225 or another application can recover data from these copies on tape storage device 250.

Figure 3:
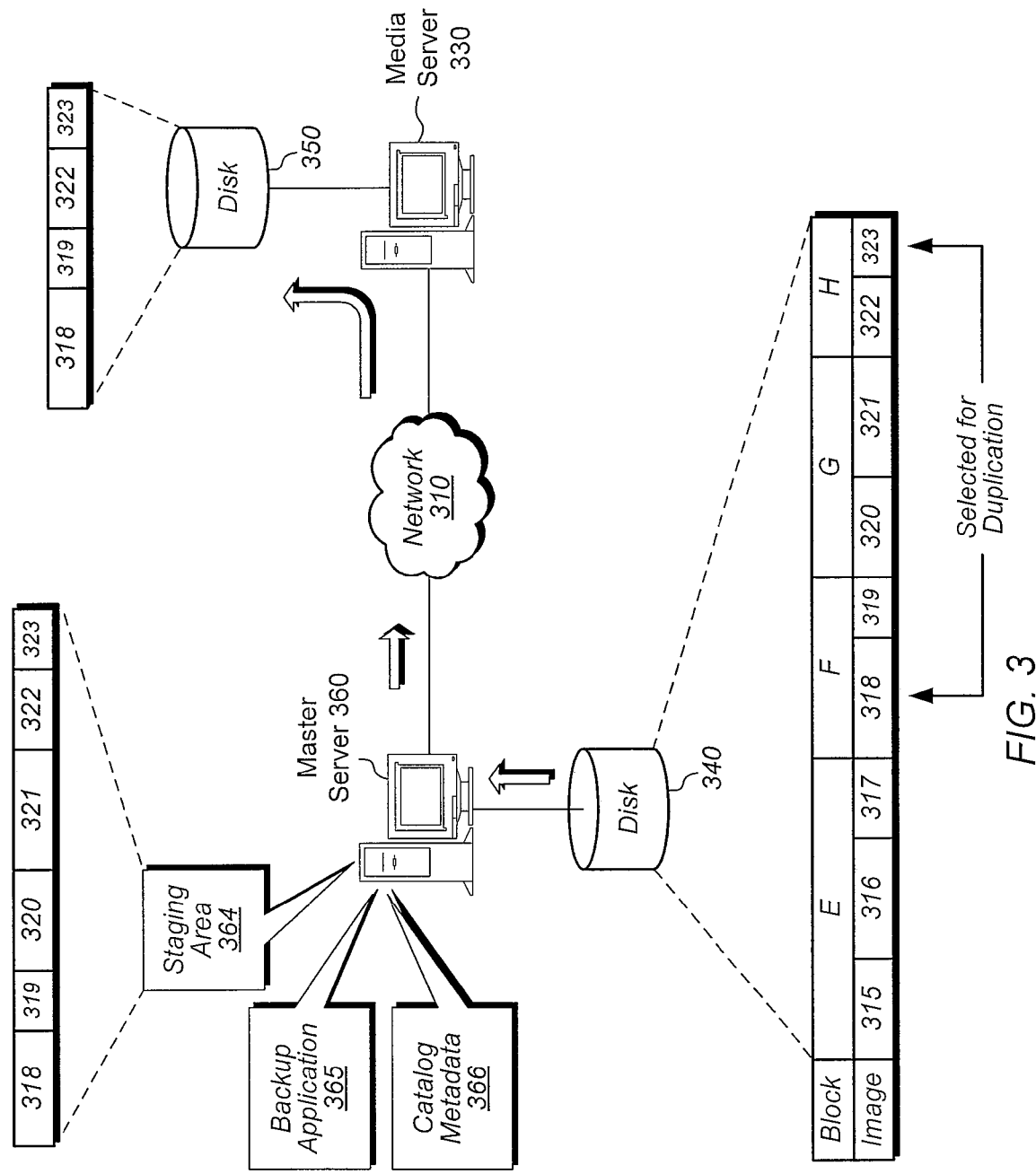
FIG. 3 illustrates one embodiment of a second type of a data duplication operation.

Turning now to FIG. 3, one embodiment of a system to duplicate data is shown. Images 315-323 are stored on disk 340, and in the example illustrated, images 318 and 323 have been selected for duplication. In other embodiments, more or fewer images may be selected for duplication. The block arrows of FIG. 3 represent the flow of data during the illustrated duplication operation. Disk 340 is representative of any type of storage device which may be used in a backup storage system. In one embodiment, disk 340 may be a single disk within a disk volume, wherein the disk volume is comprised of multiple disks. Master server 360 is connected to disk 340, and master server 360 hosts backup application 365 and stores catalog metadata 366. Backup application 365 may read and process catalog metadata 366 to determine the location of the data on disk 340 and to determine the best method to use for duplicating the selected images (i.e., images 318 and 323).

After processing catalog metadata 366 and determining the first block of disk 340 that contains an image selected for duplication, backup application 365 may read from block F of disk 340 to the end of disk 340. In some embodiments, an end of file (EOF) marker may exist at the end of the disk, and backup application 365 may read from block F of disk 340 until it reaches the EOF marker. Blocks F, G, and H (containing images 318-323) may be copied to staging area 364. Staging area 364 may be a fast storage medium that offers rapid access to data so that it is not a bottleneck during the duplication operation. In one embodiment, staging area 364 may be a portion of memory within master server 360. In another embodiment, staging area 364 may be a separate storage device (not shown) connected to master server 360. After the blocks are copied from disk 340 to staging area 364, backup application 365 may discard the unwanted blocks (i.e., block G containing images 320-321) and write only blocks F and H to disk 350. Backup application 365 may write blocks F and H to media server 330 over network 310, and media server 330 may write blocks F and H to disk 350.

After blocks F and H have been written to disk 350, catalog metadata 366 may be updated to include references to images 318-319 and 322-323 on disk 350. Therefore, future restore operations may utilize the copies of images 318-319 and 322-323 on disk 350, in addition to images 318-319 and 322-323 stored on disk 340. Multiple updates to catalog metadata 366 may be chained together to allow for a faster update operation. In another embodiment, catalog metadata 366 may be updated to include references to images 318-319 and 322-323 on disk 350 prior to the duplication operation. In a further embodiment, catalog metadata 366 may be updated to include references to images 318-319 and 322-323 on disk 350 during the duplication operation. Backup application 365 may determine when to update catalog metadata 366 based on the metadata to data size ratio. In the illustrated duplication operation, unselected images 319 and 322 are copied from disk 340 to disk 350, but unselected images 320-321 are discarded from staging area 364. As a result, the amount of extra storage space utilized on disk 350 for unintended copies of images is reduced. The embodiment illustrated in FIG. 3 may allow for fast duplication of data while also reducing the amount of storage used in disk 350 for unselected images.

In one embodiment, backup application 365 may be configured to automatically select from several methods offering tunable levels of duplication performance. The available methods may comprise image-by-image duplication, block-by-block duplication of the entire storage medium, block-by-block duplication from the first block containing selected data through the last block containing selected data, block-by-block duplication of only blocks containing selected data, and block-by-block duplication using a staging area. Backup application 365 may select which method to use based on the level of fragmentation, number of images per block, and metadata to data size ratio. Backup application 365 may set thresholds for each of these metrics, and backup application 365 may choose a method based on which thresholds have been exceeded.

Backup application 365 may also use information on the storage utilization of the target storage device (i.e., disk 350), staging area 364, and other storage devices (not shown) connected to master server 360 and media server 330 to determine which method to use. In another embodiment, a user may select which method to use for replicating data. Backup application 365 may process the catalog metadata 366 to predict how long it will take to replicate data using the different methods available. Backup application 365 may also predict how much storage space would be utilized with each of the different methods. After calculating how long each method will take, and how much storage space will be required for each method, backup application 365 may present these results to a user, and the user may then select from the available methods based on these results.

Figure 4:
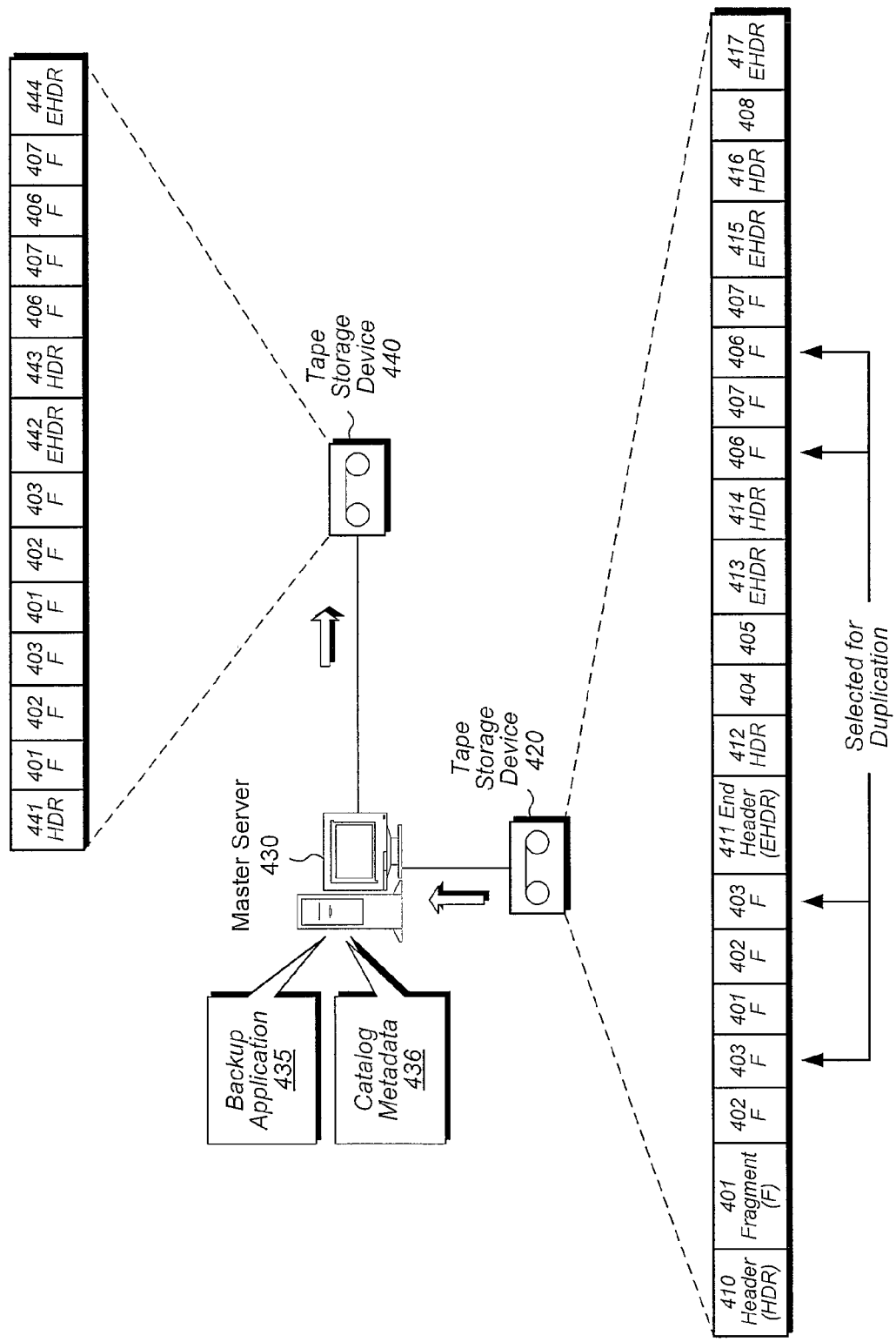
FIG. 4 illustrates one embodiment of a third type of a data duplication operation.

Referring now to FIG. 4, one embodiment of a system to duplicate data is shown. Master server 430 is connected to tape storage devices 420 and 440. Also, master server 430 hosts backup application 435 and stores catalog metadata 436. In the example illustrated, data is stored on tape storage device 420 as full images or as fragments of images. In other embodiments, data may be stored in other formats (e.g., snapshots, files). Header 410 is stored at the start of tape storage device 420, and then the first fragments of images 401-403 are stored next, followed by the second fragments of images 401-403. The two fragments of images 401-403 make up the entire image for each of images 401-403. In another embodiment, images may be broken up into more than two fragments. In a further embodiment, image fragments may be stored in separate blocks.

After the second fragment of image 403, end header 411 is stored as a tape marker, which serves as a boundary between the first and second blocks of tape storage device 420. Then header 412 is stored after end header 411, and then images 404 and 405 are stored next. After image 405, end header 413 is stored on tape storage device 420, followed by header 414. Next, the first fragments of images 406 and 407 are stored, followed by the second fragments of images 406 and 407. The two fragments of images 406 and 407 make up the entire image for images 406 and 407. Next, end header 415 is stored, followed by header 416. Then, full image 408 is stored, followed by end header 417, which is also the end of tape storage device 420. The area between a header and end header may constitute a block on tape storage device 420, with the header and end header serving as boundaries for the blocks. The example of images and fragments of images stored on tape storage device 420 is for illustrative purposes only; other storage devices may store data, files, or images in different configurations or patterns.

In the example shown in FIG. 4, two images are selected for duplication from tape storage device 420 to tape storage device 440: image 403 and image 406. Prior to duplicating images 403 and 406, backup application 435 may process catalog metadata 436. The processing may comprise building a map with locations of the images selected for duplication (i.e., images 403 and 406). Backup application 435 may determine, based on the non-continuous locations of fragments of image 403 within a single block, to copy the entire block (from header 410 to end header 411) from tape storage device 420 to tape storage device 440. Backup application 435 may write header 441 on tape storage device 440 at the start of the transferred block and write end header 442 at the end of the block. Header 441 may also have a backup identification to associate the images in the block with a specific backup operation or client. This backup identification may be stored as an address in catalog metadata 436.

Then, backup application 435 may determine to short-circuit reading from tape storage device 420 from end header 411 to header 414, since no fragments or images in the block between header 412 and end header 414 are needed as part of the duplication operation of images 403 and 406. As referred to herein, "short-circuit" shall mean to stop reading from a storage device and move to the next block boundary of a block that contains data selected for duplication, or to release the storage device if no more blocks are needed. After short-circuiting to header 414, backup application 435 may determine to copy the entire block (from header 414 to end header 415) from tape storage device 420 to tape storage device 440, based on the non-contiguous locations of fragments of image 406 within the block. Backup application 435 may write header 443 and end header 444 to tape storage device 440 as boundaries of the duplicated block. Then, backup application 435 may finish reading from tape storage device 420 as there are no more blocks needed to duplicate the selected images (i.e., image 403 and 406). Each of the decisions on whether or not to duplicate a block or to short-circuit to the next block by backup application 435 may be based on information obtained from the pre-processing of catalog metadata 436.

Figure 5:
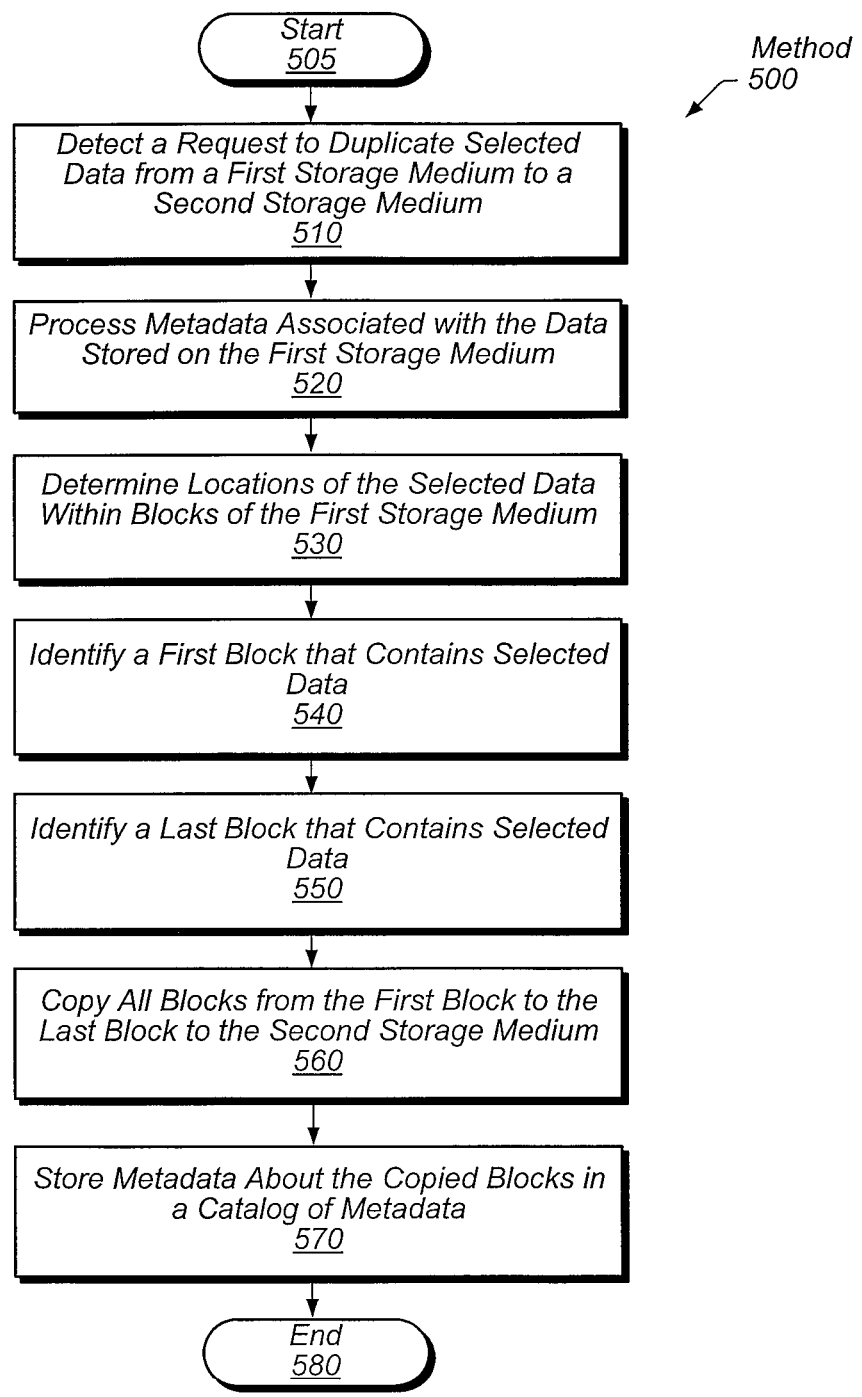
FIG. 5 is a generalized flow diagram illustrating one embodiment of a method to duplicate data at a block level.

Turning now to FIG. 5, an embodiment of a method 500 for duplicating data at a block level is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 500 starts in block 505, and then a request to duplicate data from a first storage medium to a second storage medium is detected in block 510. Next, a backup application or other software application may process metadata associated with the data stored on the first storage medium (block 520). Then, the backup application may determine the locations of the selected data within blocks of the first storage medium (block 530). A first block that contains selected data on the first storage medium may be identified in block 540. Next, a last block that contains selected data on the first storage medium may be identified in block 550. Then, all blocks from the first block to the last block may be copied to the second storage medium in block 560. Next, metadata about the copied blocks may be stored in a catalog of metadata (block 570). After block 570, the method may end in block 580.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for duplicating data, the method comprising:
   detecting a request to duplicate one or more selected images from a first storage medium to a second storage medium, wherein the first and second storage mediums are backup storage mediums, and wherein the selected images are stored within blocks on the first storage medium;
   processing metadata associated with data stored on the first storage medium to determine locations of the selected images within blocks of the first storage medium;
   copying data on a block level basis from the first storage medium to the second storage medium; and
   storing metadata about the copied blocks in a catalog of metadata;
   identifying a first block on the first storage medium that contains data corresponding to a selected image of the selected images; and
   identifying a second block on the first storage medium that contains data corresponding to a selected image of the selected images;
   wherein copying data at a block level from the first storage medium to the second storage medium comprises copying the first block, the second block, and one or more blocks between the first block and the second block that do not contain data corresponding to a selected image of the selected images.

2. The method as recited in claim 1, wherein copying data on a block level basis from the first storage medium to the second storage medium comprises:
   copying data block by block at a raw level from the first storage medium to a staging area, wherein the data includes one or more unwanted blocks;
   discarding the one or more unwanted blocks from the staging area; and
   copying blocks containing selected images from the staging area to the second storage medium.

3. The method as recited in claim 1, wherein at least two selected images are stored in non-contiguous locations within a single block on the first storage medium.

4. The method as recited in claim 1, wherein at least one selected image is stored as two or more fragments on the first storage medium, and wherein at least two of the two or more fragments are stored in non-contiguous locations within a single block.

5. A non-transitory computer readable storage medium comprising program instructions to duplicate data, wherein when executed the program instructions are operable to:
   detect a request to duplicate one or more selected images from a first storage medium to a second storage medium, wherein the first and second storage mediums are backup storage mediums, and wherein the selected images are stored within blocks on the first storage medium;

process metadata associated with data stored on the first storage medium to determine locations of the selected images within blocks of the first storage medium;

copy data on a block level basis from the first storage medium to the second storage medium; and store metadata about the copied blocks in a catalog of metadata;

identify a first block on the first storage medium that contains data corresponding to a selected image of the selected images; and identify a second block on the first storage medium that contains data corresponding to a selected image of the selected images;

wherein copying data at a block level from the first storage medium to the second storage medium comprises copying the first block, the second block, and one or more blocks between the first block and the second block that do not contain data corresponding to a selected image of the selected images.

6. The non-transitory computer readable storage medium as recited in claim 5, wherein copying data on a block level basis from the first storage medium to the second storage medium comprises:

copying data block by block at a raw level from the first storage medium to a staging area, wherein the data includes one or more unwanted blocks;

discarding the one or more unwanted blocks from the staging area; and copying blocks containing selected images from the staging area to the second storage medium.

7. The non-transitory computer readable storage medium as recited in claim 5, wherein at least two selected images are stored in non-contiguous locations within a single block on the first storage medium.

8. The non-transitory computer readable storage medium as recited in claim 5, wherein at least one selected image is stored as two or more fragments on the first storage medium, and wherein at least two of the two or more fragments are stored in non-contiguous locations within a single block.

9. A computer system comprising:

a server, wherein the server comprises a processor and a memory;

a first storage medium; and a second storage medium;

wherein the server is configured to:

detect a request to duplicate one or more selected images from a first storage medium to a second storage medium, wherein the first and second storage mediums are backup storage mediums, and wherein the selected images are stored within blocks on the first storage medium;

process metadata associated with data stored on the first storage medium to determine locations of the selected images within blocks of the first storage medium;

copy data on a block level basis from the first storage medium to the second storage medium; and store metadata about the copied blocks in a catalog of metadata;

identify a first block on the first storage medium that contains data corresponding to a selected image of the selected images; and identify a second block on the first storage medium that contains data corresponding to a selected image of the selected images;

wherein copying data at a block level from the first storage medium to the second storage medium comprises copying the first block, the second block, and one or more blocks between the first block and the second block that do not contain data corresponding to a selected image of the selected images.

10. The system as recited in claim 9, wherein at least two selected images are stored in non-contiguous locations within a single block on the first storage medium.

11. The system as recited in claim 9, wherein at least one selected image is stored as two or more fragments on the first storage medium, and wherein at least two of the two or more fragments are stored in non-contiguous locations within a single block.

12. A method for duplicating data, the method comprising:

detecting a request to duplicate one or more selected images from a first storage medium to a second storage medium, wherein the selected images are stored within blocks on the first storage medium;

processing metadata associated with data stored on the first storage medium to determine locations of the selected images within blocks of the first storage medium;

copying data on a block level basis from the first storage medium to the second storage medium; and storing metadata about the copied blocks in a catalog of metadata;

processing metadata to determine a factor comprising at least one of the following: a level of fragmentation, a metadata to data size ratio, and an image density per block of the selected images on the first storage medium; and selecting from one of a plurality of duplication methods to copy the selected images from the first storage medium to the second storage medium based on said factor.

13. The method as recited in claim 12, wherein prior to selecting from one of the plurality of duplication methods, the method comprises:

predicting a first amount of time and storage space on the second storage medium necessary to copy the one or more selected images on an image level basis; and predicting a second amount of time and storage space on the second storage medium necessary to copy the one or more selected images on a block level basis.

14. A non-transitory computer readable storage medium comprising program instructions to duplicate data, wherein when executed the program instructions are operable to:

detect a request to duplicate one or more selected images from a first storage medium to a second storage medium, wherein the selected images are stored within blocks on the first storage medium;

process metadata associated with data stored on the first storage medium to determine locations of the selected images within blocks of the first storage medium;

copy data on a block level basis from the first storage medium to the second storage medium;

store metadata about the copied blocks in a catalog of metadata;

process metadata to determine a factor comprising at least one of the following: a level of fragmentation, a metadata to data size ratio, and an image density per block of the selected images on the first storage medium; and select from one of a plurality of duplication methods to copy the selected images from the first storage medium to the second storage medium based on said factor.

15. The non-transitory computer readable storage medium as recited in claim 14, wherein prior to selecting from one of the plurality of duplication methods, the program instructions are operable to:

predict a first amount of time and storage space on the second storage medium necessary to copy the one or more selected images on an image level basis; and predict a second amount of time and storage space on the second storage medium necessary to copy the one or more selected images on a block level basis.

16. A computer system comprising:

a server, wherein the server comprises a processor and a memory;

a first storage medium; and a second storage medium;

wherein the server is configured to:

detect a request to duplicate one or more selected images from a first storage medium to a second storage medium, wherein the selected images are stored within blocks on the first storage medium;

process metadata associated with data stored on the first storage medium to determine locations of the selected images within blocks of the first storage medium;

copy data on a block level basis from the first storage medium to the second storage medium; and store metadata about the copied blocks in a catalog of metadata;

process metadata to determine a factor comprising at least one of the following: a level of fragmentation, a metadata to data size ratio, and an image density per block of the selected images on the first storage medium; and select from one of a plurality of duplication methods to copy the selected images from the first storage medium to the second storage medium based on said factor.

17. The system as recited in claim 16, wherein prior to selecting from one of the plurality of duplication methods, the server is configured to:

predict a first amount of time and storage space on the second storage medium necessary to copy the one or more selected images on an image level basis; and predict a second amount of time and storage space on the second storage medium necessary to copy the one or more selected images on a block level basis.

\* \* \* \* \*